(12) United States Patent
Chen et al.

(10) Patent No.: US 9,992,278 B2
(45) Date of Patent: Jun. 5, 2018

(54) AUTOMATIC ACCOUNT SELECTION

(71) Applicant: Dropbox, Inc., San Francisco, CA (US)

(72) Inventors: Alicia Chen, San Francisco, CA (US); David Euresti, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 947 days.

(21) Appl. No.: 13/871,480

(22) Filed: Apr. 26, 2013

(65) Prior Publication Data

US 2014/0325016 A1   Oct. 30, 2014

(51) Int. Cl.
*G06F 15/16* (2006.01)
*H04L 29/08* (2006.01)

(52) U.S. Cl.
CPC .......... *H04L 67/1095* (2013.01); *H04L 67/18* (2013.01); *H04L 67/306* (2013.01)

(58) Field of Classification Search
CPC .......... H04L 29/08; H04W 4/24; G06F 17/30; G06F 17/30035
See application file for complete search history.

(56) References Cited

U.S. PATENT DOCUMENTS

| 8,949,353 | B1* | 2/2015 | Beguin | H04L 51/28 709/206 |
| 2003/0184793 | A1* | 10/2003 | Pineau | H04L 67/06 358/1.15 |
| 2005/0171939 | A1* | 8/2005 | Fisher | G06F 17/30179 |
| 2007/0203954 | A1* | 8/2007 | Vargas | G06F 17/30584 |
| 2008/0117201 | A1* | 5/2008 | Martinez | G06F 17/30035 345/418 |
| 2009/0327305 | A1* | 12/2009 | Roberts | G06F 17/30035 |
| 2011/0138408 | A1* | 6/2011 | Adimatyam | H04H 60/372 725/14 |
| 2011/0225199 | A1* | 9/2011 | Marathe | G06F 17/3007 707/781 |
| 2012/0210224 | A1* | 8/2012 | Wong | H04N 21/25891 715/716 |
| 2012/0210241 | A1* | 8/2012 | Wong | H04N 21/25891 715/739 |
| 2013/0066963 | A1* | 3/2013 | Odio | G06Q 10/10 709/204 |
| 2013/0219459 | A1* | 8/2013 | Bradley | H04L 63/08 726/1 |
| 2013/0268999 | A1* | 10/2013 | Kiang | H04L 29/0854 726/4 |

* cited by examiner

*Primary Examiner* — Mohamed Ibrahim
(74) *Attorney, Agent, or Firm* — Polsinelli PC

(57) ABSTRACT

A content item uploaded to a content management system from a client device can be assigned to one of multiple user accounts on which the client device is authorized. The user account can be selected based on account selection rules dictating selection of a user account based on various factors. For example, the account selection rules can dictate selection of a user account based on the type of user account; the type of content item; the client device that created the content item; the time the content item was created, modified, or uploaded; the location the content item was created, modified, or uploaded; etc. The account selection rules can be specified by a user or be heuristics based on general assumptions, data gathered regarding the user, and/or historical data gathered from content items already assigned to the user accounts. The content item can be assigned to the selected user account.

22 Claims, 5 Drawing Sheets

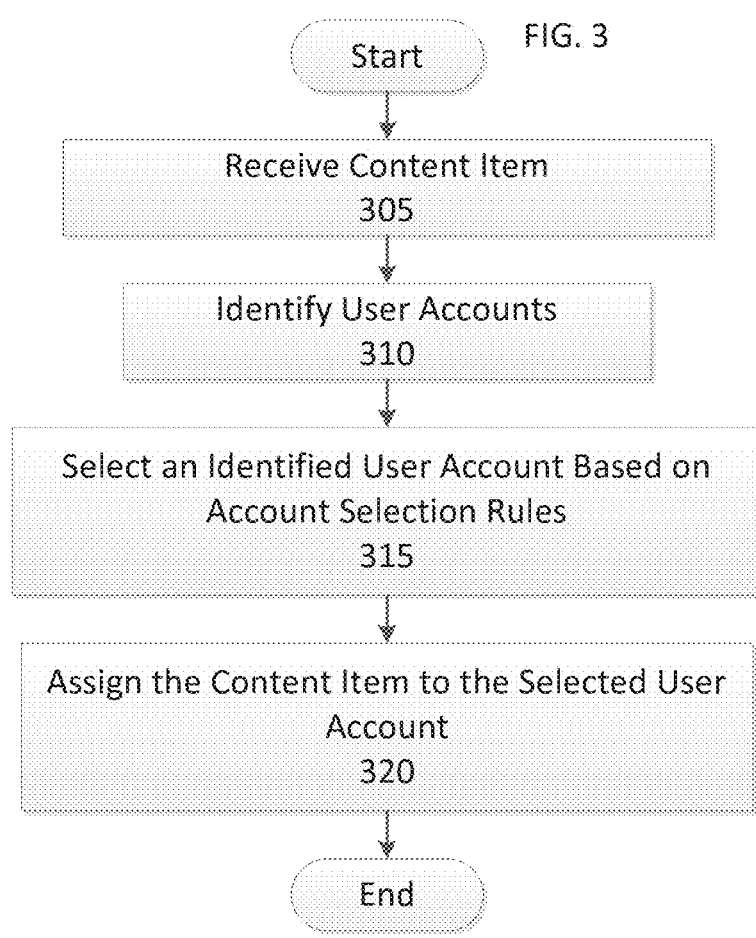

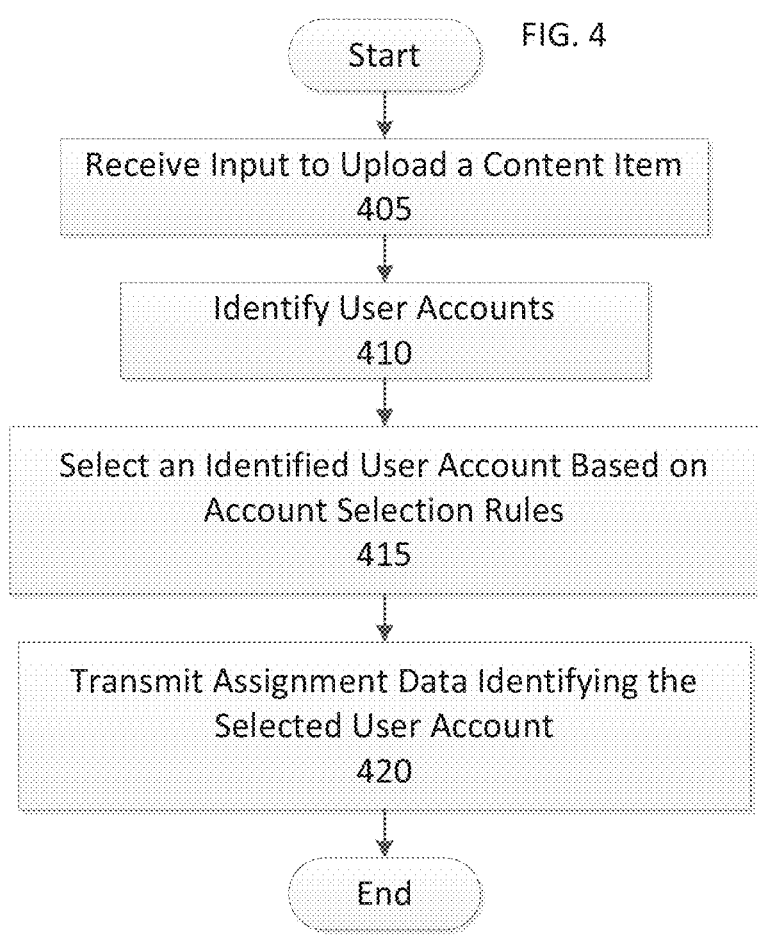

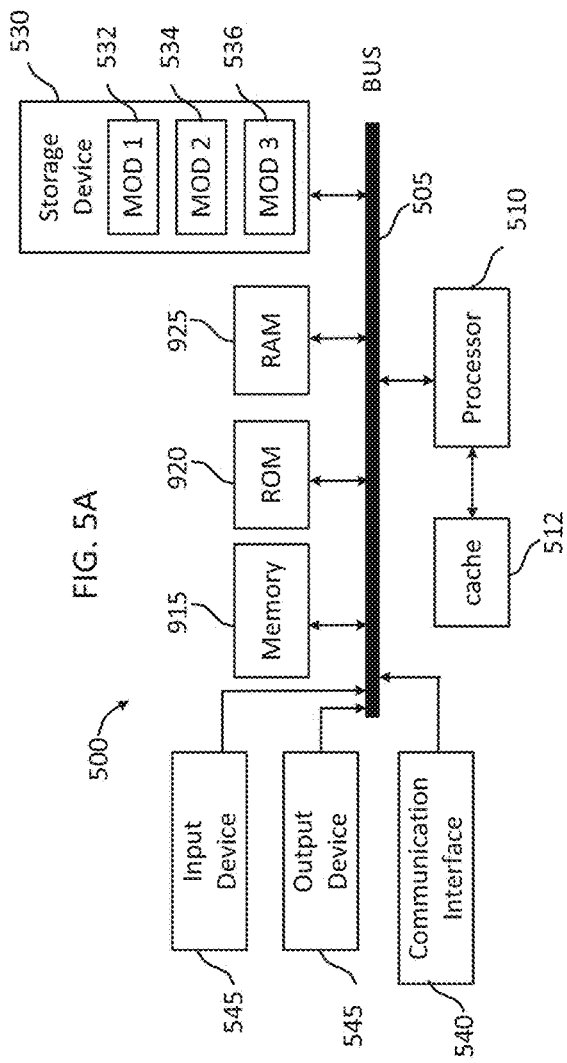
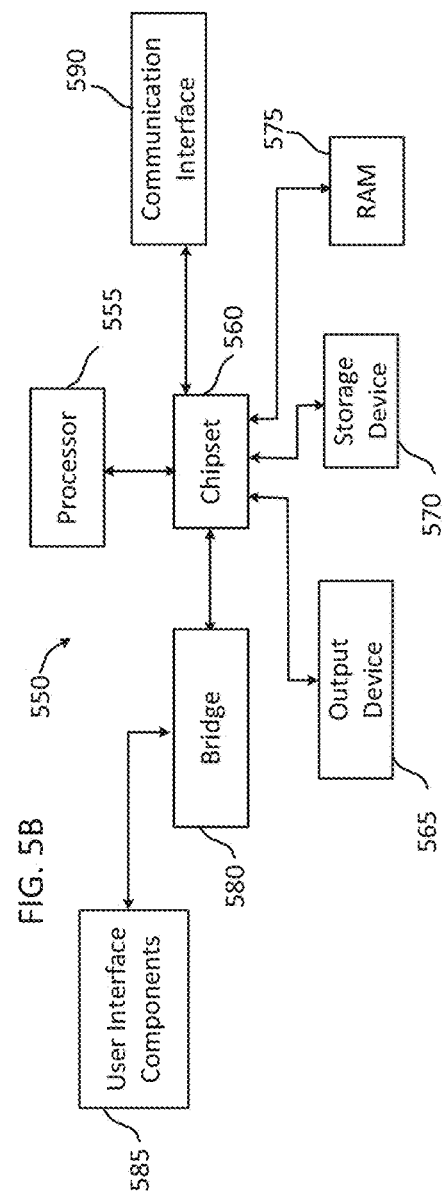

AUTOMATIC ACCOUNT SELECTION

TECHNICAL FIELD

The present technology pertains to uploading content items to multiple content management system accounts, and more specifically pertains to automatic selection of a content management system account for an uploaded content item.

BACKGROUND

Cloud storage accounts allow users to store their content items in an online user account that can be accessed from any computing device with a network connection. Users can thus upload content items such as pictures, songs, documents, etc. from a computing device to their online user account and later access the content items from different computing devices. Online user accounts can thus be useful for a user to store personal content items, as well as for a business to store content items that can be easily accessed by multiple employees. Accordingly, a user may have multiple user accounts on the content management system. For example, a user can have a personal user account and a work user account.

While having multiple user accounts allows a user to separate their personal content items from work content items, uploading content items can be difficult. A user must select the proper user account prior to uploading a content item to ensure that a content item is not assigned to the wrong user account. Accordingly, an improved method of uploading content items to multiple user accounts is needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for assigning a content item to a user account on a content management system. A client device can be authorized on multiple user accounts. For example a user can have a personal user account and a work user account. A content item can be automatically assigned to the appropriate one of the user accounts so that a user does not have to manually select the user account that the content item should be assigned to.

To accomplish this, the user accounts on which the client device is authorized can be identified. Then, one of the user accounts can be selected based on account selection rules. Account selection rules can dictate selection of a user account based on various factors. For example, in some embodiments, the account selection rules can dictate selection of a user account based on the type of content item. For example, the account selection rules can dictate that content items such as photographs be assigned to a personal user account, whereas content items such as spreadsheets be assigned to a work user account.

In some embodiments, the account selection rules can dictate selection of a user account based on the time the content item was created. For example, the account selection rules can dictate that content items created after 5 pm be assigned to a personal user account.

In some embodiments, the account selection rules can dictate selection of a user account based on the location where the content item was created. For example, the account selection rules can dictate that content items created at a geographic location near a user's work office be authorized on a work user account.

In some embodiments, the account selection rules can dictate selection of a user account based on the type of client device that created the content item. For example, the account selection rules can dictate that content items created by a mobile computing device be assigned to a personal user account.

In some embodiments, the account selection rules can be dictated by a user. Alternatively, in some embodiments, the account selection rules can be heuristics based on, for example, general assumptions. For example, the account selection rules can dictate that content items created on the weekend (Sat & Sun) be assigned to a personal user account based on the general assumption that people work Mon-Fri.

In some embodiments, the account selection rules can be based on data gathered from the user. For example, rather than assume the days that a user works based on general assumption, data indicating a user's work schedule can be gathered from a source such as a calendar application. The account selection rules can thus dictate that content items created at a time determined to be work hours for the user, be assigned to a work user account.

In some embodiments, the account selection rules can be based on data gathered from content items already assigned to the user accounts. For example, if data gathered from a user account indicates that the vast majority of the content items assigned to the user account were created after 5 pm, the account selection rules can dictate that content items created after 5 pm be assigned to the user account.

A content item can be assigned to the selected user account based on the account selection rules.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 shows an exemplary method embodiment of a content management system assigning a content item to user account;

FIG. 4 shows an exemplary method embodiment of a client device assigning a content item to a user; and FIGS. 5A and 5B show exemplary system embodiments.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for automatically assigning a content item to one of multiple user accounts. A user can have multiple user accounts, such as a personal user account and a work user account. A content item can be assigned to one of the user accounts based on account selection rules. The account selection rules can dictate selection of a user account based on various factors. For example, the account selection rules can dictate selection of a user account based on the type of user account, the type of content item, the client device that created the content item, the time the contentment item was created or uploaded, the location where the content item was created or uploaded, etc.

In some embodiments, the account selection rules can be dictated by a user. Alternatively, in some embodiments, the account selection rules can be heuristics based on general assumptions, data gathered regarding the user, and/or historical data gathered from content items already assigned to the user accounts. The content item can be assigned to the user account selected based on the account selection rules.

Figure 1:
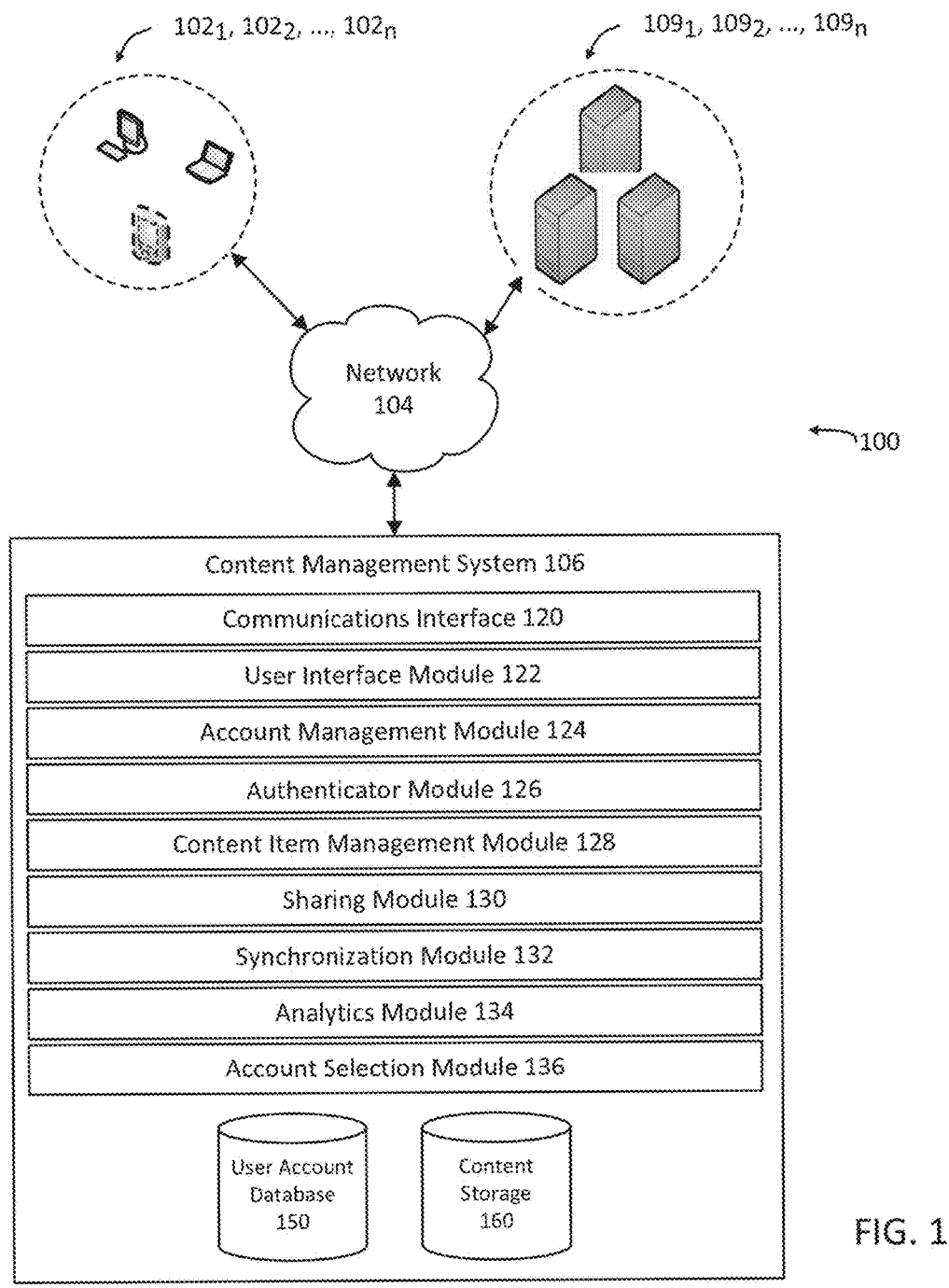
FIG. 1 shows an exemplary configuration of devices and a network in accordance with the invention.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address.

However, content management system 106 can also be configured to accept additional user information. For example, in some embodiments, user account database 150 can include data identifying client devices 102 authorized on a storage account. This data can be used to identify each client device 102 authorized on a storage account, or alternatively, each storage account that a client device $102_i$ is authorized on.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any client device 102 in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of content management system 106 is simply one possible configuration and that other configurations with more or less components are also possible. For example, in some embodiments, content management system 106 can be configured to assign a content item uploaded from client device $102_i$ to an appropriate user account.

Client device $102_i$ can be authorized on multiple user accounts. For example, a user can have a personal user account and a work user account. Client device $102_i$ can be authorized on both the personal user account and the work user account. Content management system 106 can be configured to assign a content item received from client device $102_i$ to the appropriate one of the user accounts on which client device $102_i$ is authorized. Alternatively, in some embodiments, client device $102_i$ can assign the content item to the appropriate one of the user accounts (discussed in FIG. 2).

To select the appropriate user account, content management system 106 can include account selection module 136. Account selection module 136 can be configured to identify the user accounts on which client device $102_i$ is authorized and assign a content item received from client device $102_i$ to the appropriate one of the identified user accounts.

In some embodiments, account selection module 136 can be configured to identify user accounts on which client device $102_i$ is authorized by searching user account database 150. For example, client device $102_i$ can transmit data identifying client device $102_i$ to content management system 106 and account selection module 136 can use the data identifying client device $102_i$ to search user account database 150 to identify user accounts on which client device $102_i$ is authorized. Alternatively, in some embodiments, client device $102_i$ can transmit to content management system 106, data identifying user accounts on which client device $102_i$ is authorized.

Upon identifying the user accounts on which client device $102_i$ is authorized, account selection module 136 can be configured to assigned a content item uploaded from client device $102_i$ to the appropriate one of the identified user accounts. In some embodiments, account selection module 136 can select one of the identified user accounts to which the content item should be assigned based on account selection rules. Account selection rules can be rules that dictate selection of a user account.

In some embodiments, the account selection rules can dictate selection of a user account based on the type of content item. For example, the account selection rules can dictate that specified types of content items should be assigned to a specific user account. Alternatively, the account selection rules can dictate that specified types of content items should not be assigned to a specific user account.

As an example, in some embodiments, the account selection rules can dictate that spreadsheets be assigned to a work user account. Alternatively, the account selection rules can dictate that music files never be assigned to a work user account. As another example, the account selection rules can dictate that photographs or image files always be assigned to a personal user account.

In some embodiments, the account selection rules can be based on the type of application that created or modified the content item. For example, the account selection rules can dictate that all content items created by a word processing application be assigned to a work user account. Alternatively, the account selection rules can dictate that all content items modified by a music program be assigned to a personal user account.

In some embodiments, the account selection rules can be based on the specific application that created or modified the content item. A user may use different applications to create or modify personal content items than to create or modify work related content items. For example, a user may use a first word processor application to create personal documents and a second word processor application to create work related documents. Thus, the account selection rules can dictate that all content items created by the first word processor application be assigned to a personal user account, whereas all content items created by the second word processor application be assigned to the work user account.

In some embodiments, the account selection rules can dictate selection of a user account based on the type of client device that created and/or modified the content item, such as a mobile computing device, camera, audio recording device, etc. For example, the account selection rules can dictate that content items created by a camera be assigned to a personal user account. Alternatively, the account selection rules can dictate that content items created by an audio recording device never be assigned to a work user account.

In some embodiments, the account selection rules can dictate selection of a user account based on the specific client device that created or modified the content item. For example, a user may have a work computer and a personal computer. The account selection rules can thus dictate that all content items created by the user's work computer be assigned to the work user account, whereas content items created by the user's personal computer be assigned to the personal user account. Alternatively, the account selection rules can dictate that content items created on a user's personal computer never be assigned to a work user account. In another example, a user may have a work phone and personal phone. The account selection rules can dictate that content imported to the client device from the work phone be assigned to the work user account, whereas content imported to the client device from the personal phone be assigned to the personal user account.

In some embodiments, the account selection rules can dictate selection of a user account based on the type of component of a client device that created or modified the content item. Examples of components of a client device include a microphone, camera, touchscreen, etc. For example, the account selection rules can dictate that content items created by a microphone of a client device be assigned to a work user account, whereas content items created by a client device be assigned to a personal user account.

In some embodiments, the account selection rules can dictate selection of a user account based on an e-mail account the content item was received from. For example, a user can receive a content item as an attachment to an e-mail. The account selection rules can thus dictate that content items received from a specified e-mail address be assigned to a personal storage account. Alternatively, the account selection rules can dictate that content items received from a specified e-mail account never be assigned to a work storage account.

In some embodiments, the account selection rules can dictate selection of a user account based on the domain of the e-mail from which the content item was received. For example, the account selection rules can dictate that all content items received as an attachment to an e-mail from a user's work domain be assigned to a work user account. Alternatively, the account selection rules can dictate that content items received as an attachment to an e-mail from a personal e-mail domain be assigned to a personal storage account.

In some embodiments, the account selection rules can dictate selection of a user account based on the e-mail account at which the content item was received. For example, the account selection rules can dictate that all content items received as an attachment at a user's personal e-mail account be assigned to a personal user account, whereas all content items received as an attachment at a user's work e-mail account be assigned to a work user account.

In some embodiments, the account selection rules can dictate selection of a user account based on the time the content item was created or modified. For example, the account selection rules can dictate that content items created during 8 am-5 pm be assigned to a work user account. Alternatively, in some embodiments, the account selection rules can dictate that content items created or modified on Saturday-Sunday be assigned to a personal storage account. As another example, the account selection rules can dictate that content items created Mon-Fri 8 am-5 pm be assigned to a work user account.

In some embodiments, the account selection rules can dictate selection of a user account based on the time the content item is uploaded to content management system 106. For example, the account selection rules can dictate that content items uploaded Mon-Fri 8 am-5 pm be assigned to a work user account. Alternatively, the account selection rules can dictate that content items uploaded on Sat-Sun not be assigned to a work storage account.

In some embodiments, the account selection rules can be based on the geographic location where the content item was created or modified. For example, the account selection rules can dictate that content items created or modified at a geographic location within a specified radius of the user's home be assigned to a personal user account. Alternatively, the account selection rules can dictate that content items created or modified at a geographic location within a specified radius of the user's work office be assigned to a work user account. As another example, the account selection rules can dictate that content items created or modified at a geographic location that is outside of a specified radius of the user's work office should not be assigned to a work user account.

In some embodiments, the account selection rules can dictate selection of a user account based on the geographic location where the content item is uploaded to content management system 106. For example, the account selection rules can dictate that content items uploaded at a geographic location within a specified radius of the user's home be assigned to a personal user account. Alternatively, the account selection rules can dictate that content items uploaded at geographic location within a specified radius of the user's work office be assigned to a work user account.

The above examples of account selection rules are only some possible embodiments and are not meant to be limiting. One skilled in the art would recognize that account selection rules can dictate selection of a user account based on a variety of factors, or combinations thereof, and this disclosure contemplates any and all such embodiments.

To apply the account selection rules, account selection module 136 can be configured to gather account metadata and content item metadata. Account metadata can be metadata describing a user account. For example, account metadata can identify the type of user account such as personal or work. In some embodiments, account metadata describing a storage account can be stored in account database 150 and associated with the storage account. Account selection module 136 can thus communicate with account database 150 to gather account metadata describing each of the identified user accounts.

Content item metadata can be any type of data describing the content item. In some embodiments, content item metadata can identify the source of the content item. For example, content item metadata can indicate the type of device that created or modified the content item, such as a mobile computing device, camera, etc.

Alternatively, content item metadata can identify the individual client device that created or modified the content item. For example, content item metadata can include a unique device identifier that identifies an individual client device such as client device $102_i$.

Further, in some embodiments, content item metadata can identify the component of a client device that created or modified the content item. For example, content item metadata can indicate that a content item was created by a camera of a mobile computing device. Alternatively, content item metadata can indicate that a content item was created by a microphone of a computing device.

In some embodiments, content item metadata can identify an e-mail account the content item was received at or transmitted from. For example, account metadata describing a content item received as an attachment to an e-mail can identify the e-mail address of the sender of the e-mail as well as the e-mail address of the recipient of the e-mail.

In some embodiments, content item metadata can identify the time a content item was created or modified. For example, content item metadata can include the time and date the content item was created or modified.

In some embodiments, content item metadata can identify the geographic location where a content item was created or modified. Alternatively, content item metadata can indicate the geographic location from which the content item was uploaded to content management system 106.

In some embodiments, content item metadata can be gathered from the content item itself. For example, content item metadata such as the size, type, author, etc. can be gathered from the content item. In some embodiments, content item metadata can be gathered from a client device. For example, content item metadata such as the location a content item was created, modified or uploaded can be gathered from a GPS component of a client device and associated with the content item. As another example, an e-mail address the content item was received from can be gathered from the client device. For example, the client device can gather the e-mail address and associate it with the content item.

In some embodiments, content items can be analyzed to gather content item metadata. For example, in some embodiments content items such as image files can be scanned to identify the context of the image file. For example, a content item can be scanned to determine if the content items is a picture of a whiteboard, thus suggesting that the content items is work related content item. Alternatively, scanning a content item can indicate that the content item is a photograph taken in an outdoor setting, thus suggesting that the content item is a personal content item. An another example, scanning a content item can indicate that the content item is an image of a receipt.

In some embodiments, a content item can be scanned to identify the identity of any persons depicted by the content item. For example, content items such as photographs can include images of people, the face of which can be identified using a database of tagged images. For example, many common photograph management applications and social networking sites are allow a user to tag their photographs. In some embodiments, tagging data can be gathered from a photograph management application and/or a social networking site to identify the identity of the persons depicted in the photograph. In some embodiments, the identities can be determined to be work acquaintances or personal acquaintances. For example, data gathered from a calendar and e-mail application can suggest whether an identified person in a work or personal acquaintance.

In some embodiments, a content item can be scanned using Optical Character Recognition (OCR) to gather metadata. For example, a content item can be scanned to gather names, dates, e-mail addresses, etc. The data gathered can be used to categorize the content item, for example, as an e-mail, receipt, etc. Further, any identified names can be used to determine if the content item is work related or personal.

The above examples of content item metadata are just some possible examples and are not meant to be limiting. One skilled in the art would recognize that content item metadata can be any of a variety of types of data describing the content and this disclosure contemplates any and all such embodiments.

Account selection module 136 can be configured to use content item metadata describing a content item received from client device $102_i$ along with account metadata describing each identified user account to select one of the identified user accounts based on the account selection rules. Account selection module 136 can then assign the content item to the selected user account.

In some embodiments, the account selection rules can be set by a user. For example, account selection module 136 can be configured to cause client device $102_i$ to present the user with an account selection interface configured to gather account selection rules from the user. For example, the user can use the account selection interface to specify the types of content items that should be stored in each of the user's user accounts. Alternatively, a client application installed on client device $102_i$ can include an interface to gather account selection rules from the user.

In some embodiments, the account selection rules can be heuristics rather than rules set by a user. For example, the account selection rules can be based on one or more general assumptions. As an example, the account selection rules can dictate that content items created or modified during traditional working hours, i.e. Monday-Friday, 8 am-5 pm, be assigned to a work user account, whereas content items created or modified during non-traditional working hours, i.e. after 7 pm or Saturday and Sunday, be assigned to a personal user account.

As another example, the heuristics can be based on an assumption that specific types of client devices, such as cameras, are used only to create or modify content items for personal use rather than for work. Thus the account selection rules can dictate that content items created or modified by a camera be assigned to a personal user account. Further, a similar assumption can be made that content items created or modified by a client device such as a desktop computer are work related. Thus, the account selection rules can dictate that all content items created or modified by a desktop computer be assigned to a work user account.

Alternatively, the heuristics can be based on an assumption that content items created or modified by certain user devices are always either work related or personal. Thus, the account selection rules can dictate that all content items created or modified by a client device known to be a user's personal computing device, be assigned to a personal user account, whereas content items created or modified by a client device known to be the user's work computing device be assigned to a work user account.

In some embodiments, the heuristics can be based on an assumption that certain types of content item are always either work related or personal. For example, the account selection rules can dictate that content items such as movies, photographs and music be assigned to a personal user account, whereas content items such as spreadsheets, presentations, etc. be assigned to a work user account.

In some embodiments, the heuristics can be based on an assumption that content items created or modified at a certain geographic location are always either work related or personal. For example, the account selection rules can dictate that content items created or modified at a geographic location within a predetermined radius of the user's known work office be assigned to a work user account, whereas content items created or modified at a geographic location not within a predetermined radius of the user's known work office be assigned to a personal user account.

In some embodiments, the account selection rules can be based on data gathered from a user rather than general assumption. For example, rather than the account selection rules being based on traditional working hours, the account selection rules can be based on personal data gathered regarding a user that can be used to determine the user's work schedule. For example, in some embodiments, calendar data gathered from a calendar application running on a client device of the user can be used to determine the user's work and non-work schedule. Alternatively, user profile data known about the user may indicate the work and non-work schedule of the user. Account selection module 136 can be configured to determine the user's work and non-work hours based on the data gathered from a source such as a calendar application and/or user profile and use the determined schedule to customize the account selection rules used for the user.

In some embodiments, the account selection rules can be based on data gathered from content items assigned to a user account. For example, account selection module 136 can be configured to analyze content metadata describing content items assigned to the identified storage accounts to determine trends that can be used to create account selection rules. For instance, the content metadata such as creation time can be gathered from each content item assigned to a user account to determine a time range that the content items were created. For example, if all the content items assigned to the user account were created on a Monday-Friday between 8 am-5 pm, the account selection rules can dictate that only content items created on a Monday-Friday between 8 am-5 pm be assigned to the user account.

As another example, if the content metadata gathered from content items assigned to a user account indicate that no audio files are assigned to the user account, the account selection rules can dictate that audio files not be assigned to the user account.

In some embodiments, the account selection rules can dictate assigning varying weights to the various factors considered to select a user account. For example, the account selection rules can dictate that rules based on data gathered from a user's personal data or metadata associated with content items assigned to a storage account, be assigned a greater weight than rules based on general assumption.

Alternatively, in some embodiments, the account selection rules can dictate that rules based on the geographic location where the content item was created be assigned a greater weight than the time the content item was created. For example, the account selection rules can dictate that the fact that a content item was created at a geographic location known to be the user's work office be given greater weight than the fact that the content item was created at a time that the user is generally not working.

As another example, the account selection rules can dictate that the client device on which the content item was created be given greater weight than the geographic location at which the content item was created. For example, the account selection rules can dictate that the fact that the content item was created on a user's personal mobile phone be given greater weight than the fact that the content item was created at a geographic location that is known to the be the user's work office. Alternatively, the account selection rules can dictate that the fact that the content item was created on a user's work computer be given greater weight than the fact that the content item was created at a geographic location known to the be the user's home.

In some embodiments, account selection module 136 can be configured to identify content items that have been potentially incorrectly assigned by a user. For example, in some embodiments, the user can select which user account a content item should be assigned to. Account selection module 136 can determine if the user assigned the content item to the same user account that account selection module 136 would have assigned to the content item to, based on the account selection rules. If account selection module 136 determines that the content item was not assigned to the same user account, account selection module 136 can determine that the content item was likely incorrectly assigned by the user.

Upon a determination that a content item was incorrectly assigned by a user, in some embodiments, account selection module 136 can be configured to automatically reassign the content item to the use account selected by account selection module 136 according to the account selection rules. Alternatively, in some embodiments, account selection module 136 can be configured to alert the user that the content item was incorrectly assigned. For example, account selection module 136 can cause client device $102_i$ to present a message indicating that the content item was incorrectly assigned. Further, in some embodiments, the message can enable a user to select to keep the content item assigned to the user account selected by the user or move it to the user account selected by account selection module 136 to be the correct user account. For example, the message can include a user interface element such as a button enabling a user to select to reassign the content item to the user account selected by account selection module 136.

Figure 2:
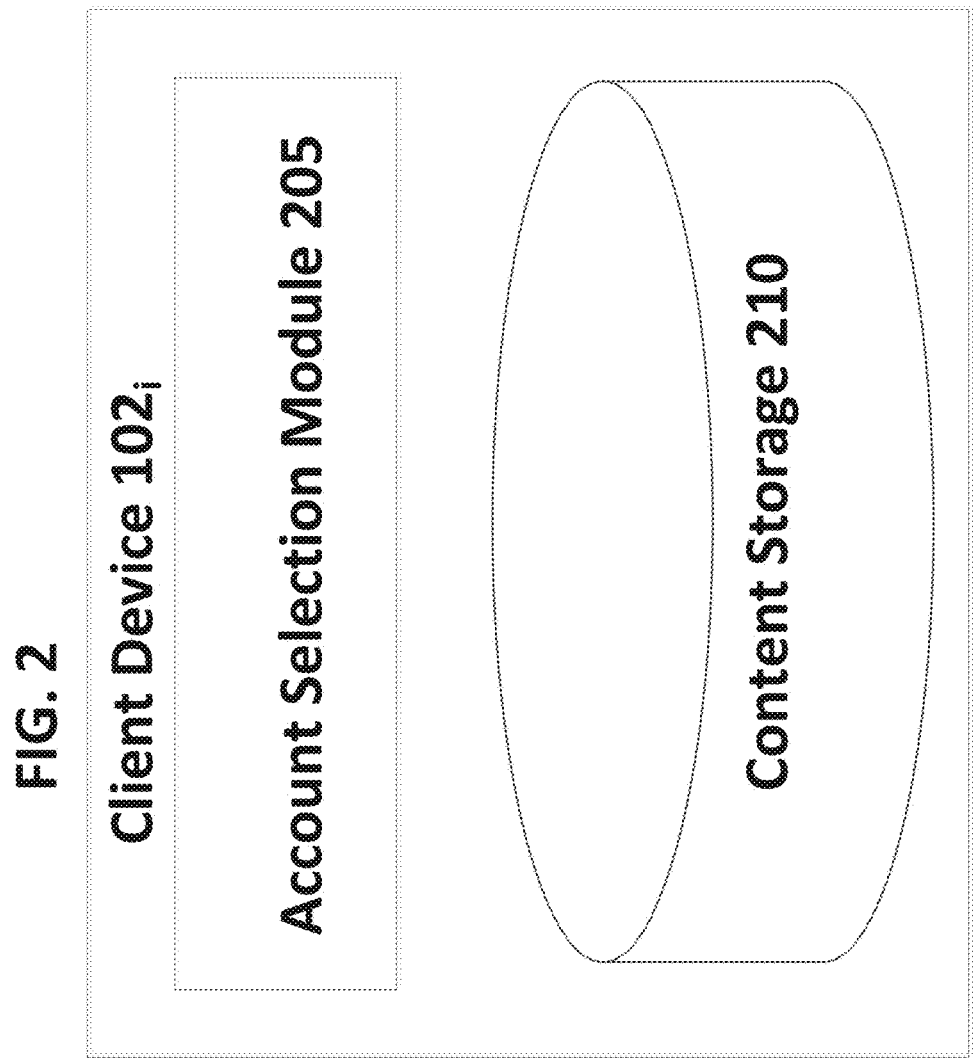
FIG. 2 shows one possible system configuration of a client device for assigning a content item to an appropriate user account.

In some embodiments, the user account to which a content item should be assigned, can be selected at client device $102_i$ rather than at content management system 106. FIG. 2 shows one possible system configuration of client device $102_i$ configured to select a user account to which a content item should be assigned. As shown, client device $102_i$ includes account selection module 205 and content storage 210. Content database 210 can be configured to store content items as well as all content item metadata associated with the stored content items.

Further, content storage 210 can store data regarding each storage account to which client device $102_i$ is authorized. This can further include all account metadata associated with the storage accounts to which client device $102_i$ is authorized.

Upon receiving an input to upload a content item stored in content database 210 to content management system 106, account selection module 205 can be configured to communicate with content database 210 to gather content item metadata for the content item as well as account metadata for the user accounts to which client device $102_i$ is authorized. Account selection module 205 can then select one of the user accounts by applying one or more account selection rules as described with respect to FIG. 1. The account selection rules can be stored on client device $102_i$.

Upon selecting a user account, account selection module 205 can be configured to transmit assignment data identifying the selected user account to content management system 106 along with the content item. In some embodiments, account selection module 205 can transmit the assignment data separately from the content item. In some embodiments, account selection module 205 can append the assignment data to the content item and transmit the content item with the appended assignment data to content management system 106. Content management system 106 can then assign the received content item to the specified user account.

FIG. 3 shows an exemplary method embodiment of a content management system assigning a content item to user account. Although specific steps are show in FIG. 3, in other embodiments a method can have more or less steps.

As shown, the method begins at block 305 where the content item is received by the content management system from the client device. At block 310 the content management system identifies user accounts to which the content item can be assigned. For example, in some embodiments, data identifying user accounts to which the content item can be assigned, can be received from the client device.

Alternatively, in some embodiments, the content management system can identify the user accounts based on data identifying the client device. For example, the content management system can use data identifying the client device to search a database that identifies the user accounts on which a client device is authorized.

At block 315 the content management system can select a user account based on account selection rules. The account selection rules can dictate selection of one of the identified user accounts based on various factors, such as those described above.

Upon selecting a user account based on the account selection rules, at block 320, the content management system can assign the content item to the selected user account. The method then ends.

FIG. 4 shows an exemplary method embodiment of a client device assigning a content item to a user. Although specific steps are show in FIG. 4, in other embodiments a method can have more or less steps.

As shown, the method begins at block 405 where the client device receives an input to upload a content item to content management system 106. In some embodiments, the input can be received as a result of a user selecting to upload the content item. Alternatively, in some embodiments, the input can be received as a result of an automatic upload process running on the client device. For example, the automatic upload process can identify a newly added content item or a change to a content item.

At block 410, the client device identifies user accounts to which the content item can be stored. For example, the client device can store data identifying each user account on which the client device is authorized. The client device can thus access this data to identify the user accounts.

At block 415, the client device can select one of the identified user account based on account selection rules that dictate selection of a storage account based on various factors, such as those described above. At block 420, the client device can transmit, to the content management system, the content item and data identifying the selected user account. The content management system can use the data to assign the content item to the identified user account. The method then ends.

FIG. 5A, and FIG. 5B show exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   receiving, by a content management system, a content item transmitted from a client application associated with the content management system for a client device, wherein the content management system maintains a first user account for a user and a second user account for the user and associates the first user account and the second user account with the client device;
   identifying, by the content management system, at least the first user account and the second user account of the content management system associated with the client device;
   selecting, by the content management system, the first user account according to account selection rules that dictate whether the content item should be assigned to the first user account or the second user account based on metadata describing at least one of:
   the first user account,
   the second user account, or
   the content item;
   assigning automatically, by the content management system, the content item to the first user account, wherein the content item is associated with a first user account identifier in the content management system;
   associating with the second user account, by the content management system, the content item; and
   synchronizing, by the content management system with the client application of the client device, assignment information for the content item, wherein the assignment information is transmitted to the client application and identifies assignment of the content item to at least the first user account.

2. The computer-implemented method of claim 1, wherein selecting the first user account according to the account selection rules comprises:
   comparing metadata indicating a preferred location of the first user account and metadata identifying a location of the content item; and when the location of the content item is within the preferred location of the first user account, determining that the content item should be assigned to the first user account.

3. The computer-implemented method of claim 2, wherein the location of the content item identifies at least one of:
a geographic position where the content item was created;
a geographic position where the content item was modified; or
a geographic position of the client device when the content item was transmitted to the content management system.

4. The computer-implemented method of claim 2, wherein the preferred location comprises a geographic region surrounding a work office of a user of the client device, and the first user account is a work user account.

5. The computer-implemented method of claim 2, wherein the preferred location comprises a geographic region surrounding a home of a user of the client device, and the first user account is a personal user account.

6. The computer-implemented method of claim 1, wherein synchronizing by the content management system with the client device comprises:
causing, by the content management system, that the client device assign the content item to the first user account.

7. A content management system, comprising:
a processor; and
a memory containing instructions that, when executed, cause the processor to:
receive a content item and a second content item transmitted from a client application associated with the content management system for a client device, wherein the content management system maintains a first user account for a user and a second user account for the user and associates the first user account and the second user account with the client device;
identify at least the first user account and the second user account of the content management system associated with the client device;
select the first user account according to account selection rules that dictate whether the content item should be assigned to the first user account or the second user account based on metadata describing at least one of:
the first user account,
the second user account, or
the content item;
assign automatically the content item to the first user account, wherein the content item is associated with a first user account identifier in the content management system;
select the first user account and the second user account according to account selection rules that dictate whether the second content item should be associated to the first user account and the second user account;
associate the second content item to the first user account and the second user account; and
synchronize, with the client application of the client device, assignment information for the content item, wherein the assignment information is transmitted to the client application and identifies assignment of the content item to at least the first user account.

8. The content management system of claim 7, wherein selecting the first user account according to the account selection rules comprises:
comparing metadata indicating a preferred client device of the first user account and metadata identifying a source client device of the content item; and
when the source client device of the content item is the preferred client device of the first user account, determining that the content item should be assigned to the first user account.

9. The content management system of claim 8, wherein a source client device identifies at least one of:
a client device that created the content item;
a client device that modified the content item; or
a client device that transmitted the content item to the content management system.

10. The content management system of claim 9, wherein the source client device of the first user account identifies at least one of:
a client device that created the content item;
a client device that modified the content item; or
a client device that transmitted the content item to the content management system.

11. The content management system of claim 7, wherein selecting the first user account according to the account selection rules comprises:
comparing metadata indicating a restricted client device of the second user account and metadata identifying the client device; and
when the client device is the restricted client device of the second user account, determining that the content item should be assigned to the first user account.

12. A computer-implemented method comprising:
receiving, by a client application of a client device of a content management system, a command to upload a content item to the content management system, wherein the content management system maintains a first user account for a user and a second user account for the user and associates the first user account and the second user account with the client device;
receiving, by the client device, a command to upload a second content item to the content management system;
identifying, by the client device, at least the first user account and the second user account associated with the user and the client device;
selecting, by the client device, the first user account according to account selection rules that dictate whether the content item should be assigned to the first user account or the second user account based on metadata describing at least one of:
the first user account,
the second user account, or
the content item;
transmitting, by the client device to the content management system, assignment data for the content item identifying automatic assignment of the content item to the first user account; and
selecting, by the client device, the first user account and the second user account according to account selection rules that dictate whether the second content item should be assigned to the first user account and the second user account;
transmitting, by the client device to the content management system, assignment data for the second content item identifying assignment of the second content item to the first user account and the second user account; and synchronizing, by the content management system with the client device, assignment information for the content item that identifies assignment of the content item to at least the first user account.

13. The computer-implemented method of claim 12, wherein selecting the first user account according to the account selection rules comprises:
   comparing metadata identifying a preferred content item type of the first user account and metadata identifying a content item type of the content item; and
   when the content item type of the content item is equal to the preferred content item type of the first user account, determining that the content item should be assigned to the first user account.

14. The computer-implemented method of claim 13, wherein a source time associated with the content item identifies at least one of:
   a time of day the content item was created,
   a day of a week the content item was created,
   a calendar date the content item was created,
   a time of day the content item was modified,
   a day of a week the content item was modified,
   a calendar date the content item was modified,
   a time of day the content item was transmitted to the content management system from the client device,
   a day of a week the content item was transmitted to the content management system from the client device, or
   a calendar date the content item was transmitted to the content management system from the client device.

15. The computer-implemented method of claim 14, wherein the first user account is a work user account and the source time of the first user account indicates a time range when a user of the client device is at work.

16. The computer-implemented method of claim 12, further comprising:
   transmitting the content item to the content management system.

17. The computer-implemented method of claim 12, wherein selecting the first user account according to the account selection rules comprises:
   comparing metadata indicating a preferred time of the first user account and metadata identifying a source time of the content item; and
   when the source time of the content item is within the preferred time of the first user account, determining that the content item should be assigned to the first user account.

18. A client device, comprising:
   a processor; and
   a memory containing instructions that, when executed, cause the processor to:
      receive a command to upload a content item to a content management system;
      receive a command to upload a second content item to the content management system;
      identify at least a first user account and a second user account associated with a user of the content management system and the client device;
      select the first user account according to account selection rules that dictate whether the content item should be assigned to the first user account or the second user account based on metadata describing at least one of:
         the first user account,
         the second user account, or
         the content item;
      appending automatically assignment data identifying assignment of the content item to the first user account; and
      select the first user account and the second user account according to account selection rules that dictate whether the second content item should be assigned to the first user account and the second user account;
      appending automatically assignment data identifying assignment of the content item to the first user account and the second user account; and
      synchronizing, by the client device and the content management system, assignment information for the content item and the second content item that identifies assignment of the content item and the second content item to at least the first user account.

19. The client device of claim 18, wherein selecting the first user account according to the account selection rules comprises:
   comparing metadata indicating a preferred e-mail address of the first user account and metadata identifying a source e-mail address of the content item; and
   when the source e-mail address of the content item matches the preferred e-mail address of the first user account, determining that the content item should be assigned to the first user account.

20. The client device of claim 19, wherein the preferred e-mail address of the first user account identifies at least one of:
   an entire e-mail address; or
   an e-mail address domain.

21. The client device of claim 18, wherein the instructions further cause the processor to:
   transmit the content item to the content management system.

22. The client device of claim 19, wherein the source e-mail address of the content item identifies at least one of:
   an e-mail address at which the content item was received as an attachment; or
   an e-mail address from which the content item was received as an attachment.

* * * * *